(12) United States Patent
Blatter et al.

(10) Patent No.: US 6,433,030 B1
(45) Date of Patent: Aug. 13, 2002

(54) METHOD FOR PROCESSING COATING POWDER WASTE AND COATING POWDERS THUS OBTAINED

(75) Inventors: Karsten Blatter, Erftstadt; David Montgomery, Köln; Heléne Bolm, Västervik, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/529,754

(22) PCT Filed: Oct. 28, 1998

(86) PCT No.: PCT/EP98/06844

§ 371 (c)(1),
(2), (4) Date: Apr. 19, 2000

(87) PCT Pub. No.: WO99/23068

PCT Pub. Date: May 14, 1999

(30) Foreign Application Priority Data

Oct. 31, 1997 (DE) .......................................... 197 48 159

(51) Int. Cl.[7] .................................................. C08J 11/04
(52) U.S. Cl. .......................................... 521/40; 521/48
(58) Field of Search ............................................. 521/40

(56) References Cited

U.S. PATENT DOCUMENTS 4,220,511 A * 9/1980 Derbyshire .............. 204/159.2
4,587,317 A * 5/1986 Renner ........................ 526/259

FOREIGN PATENT DOCUMENTS

| DE | 40 28 567 A1 | 3/1992 |
|---|---|---|
| EP | 0 683 199 A2 | 11/1995 |
| EP | 0 982 380 A1 | 3/2000 |
| WO | WO 91/18951 | 12/1991 |
| WO | WO 98/33848 | 8/1998 |

* cited by examiner

Primary Examiner—Paul R. Michl
(74) Attorney, Agent, or Firm—Sudhir G. Deshmukh

(57) ABSTRACT

A process for working up powder lacquer wastes to give re-useable powder lacquers by compacting the powder lacquer wastes, without completely melting them, to give a sintered product, in which mixtures of different types of powder lacquer wastes or mixtures of powder lacquer wastes with different standard powder lacquers are compacted and the compacted products obtained are milled to give powder lacquers without an extrusion treatment.

19 Claims, No Drawings

METHOD FOR PROCESSING COATING POWDER WASTE AND COATING POWDERS THUS OBTAINED

The invention provides a process for working up and re-using milled powder lacquer wastes, in which these wastes may be secondary products obtained during the preparation of powder lacquers or the overspray obtained when applying powder lacquers, to prepare powder lacquers without loss of quality.

Crosslinkable powder lacquers are an environmentally friendly alternative to solvent-containing liquid lacquer systems because no solvent emissions occur during application. For this reason, the use of powder lacquers has increased greatly in recent years.

Crosslinkable powder lacquers conventionally consist of one or more polymeric binders, hardeners, pigments and fillers as well as additives. The preparation of a powder lacquer is divided into the following process steps:

1. The constituents of the powder lacquer are intensively premixed dry, as solids, in the ratios by weight required.
2. The mixture is melted in an extruder at the lowest possible temperature, to avoid premature crosslinking, and intensively and thoroughly mixed. The binder and hardener are thereby plasticised and wet the pigments and fillers.
3. The optionally coloured extrudate obtained is rolled out into a thin layer, cooled and crushed to give coarse granules.
4. The granules are milled in a mill to give the final powder lacquer.

During the milling process, an unavoidable fines fraction with particle sizes <10 $\mu$m is generally removed in a subsequent screening process. The powder obtained typically has an average particle size of 40 to 70 $\mu$m.

Powder lacquers are generally prepared in a batch process. Conventional compositions and the classical method for preparing powder lacquers are described, for example, in the monographs "The Science of Powder lacquers," volumes 1 and 2 (publisher, D. A. Bate, London 1990).

The objective of the milling process is to prepare a powder with a narrow particle size distribution and the smallest possible proportion of fine fraction of <10 $\mu$m since a high proportion of fine fraction acts negatively on the processability of the powder lacquer in an electrostatic spray process. Generally, therefore, a powder with an average particle size of 40 to 70 $\mu$m is prepared and the proportion of fine fraction of less than 10 $\mu$m is separated using a suitable process, e.g. with the aid of a cyclone. This fine fraction generally amounts to about 2 to 5 wt. %. If the average particle size of the powder is reduced, which is often preferable from a technical point of view, then the proportion of fine fraction with particle sizes <10 $\mu$m increases greatly because a relatively wide particle size distribution is always obtained in the milling process.

Powder lacquers with a low average particle size and a narrow distribution of particle sizes are desirable, for example, for the preparation of thin layers of lacquer (B. Fawer, Powder lacquer, October 1996, p. 56).

The fine fraction from the milling process thus represents a secondary product of powder lacquer preparation which in many cases has to be disposed of as industrial waste. In addition, there are further residues or wastes from powder lacquer production or processing which have to be destroyed or recycled. Examples of such residues are the proportion with too large a particle size, residues from spray application, faulty batches and also residues of unsold quantities.

DE 4028567 A1 describes the recycling of overspray obtained during the application of powder lacquers and blending this with the starting materials for a fresh powder lacquer batch. There, this mixture is then further processed via conventional extruders. The constituents, in particular also the overspray, are thereby thermally melted and stressed. This process has the disadvantage that homogenous blending is difficult due to the small particle size of the overspray, there are problems with feeding the mixtures into the extruder and sometimes proportions of the powder lacquer produced have been thermally stressed several times.

WO 96/15891 describes a process which gets round the problem of metering and feeding fines by compacting the fine powder in a tablet press. The tablets obtained are then blended with the other starting materials for a fresh powder lacquer batch and introduced into the extruder. As an essential condition for compacting, it is stated that the original particles must be "substantially still recognisable" in the tablets.

EP 0 683 199 A2 describes a process for recycling fine fraction to the starting mixture during powder lacquer preparation before the extrusion step by thermal sintering of the powder, that is by distributing the fines onto a surface, agglomerating them there and then being able to add them as coarser particles to the starting mixture in a suitable amount.

A common factor in all these known processes is that recycling of the fine fraction or powder residues takes place in the first step of powder lacquer preparation. The material must therefore again pass through the entire powder lacquer production process. This procedure has the main disadvantage that the material is again melted and thermally stressed in the extruder. Since powder lacquers in many cases are thermally crosslinking systems, repeated extrusion leads to losses of quality in the powder lacquer, in particular when a high proportion of fine fraction is used. In addition, admixture to the starting materials for a fresh batch is a logistical problem because the fine fracture can only be incorporated into materials with the same formulation. In many cases the same formulation is prepared only at irregular intervals so the fine fraction has to be stored separately. For those formulations which are prepared only very rarely, recycling using the processes described hitherto is therefore not economically viable.

According to DE-C 19703376, a process for the re-use of fine powder lacquer residues obtained during preparation by milling or as overspray is described in which the powder lacquer residues are agglomerated and returned to the preparation process for the same powder lacquer. The extrusion step may then optionally be omitted and direct milling of powder lacquers which can be re-used takes place.

The object of the invention is therefore the provision of a simplified process for working up milled powder lacquer wastes which facilitates their re-use. The process is intended to lead to a homogeneous powder lacquer of undiminished quality. It is intended to provide the opportunity to produce colour mixing with the production of desired shades of colour.

It was found that this object can be achieved by the process representing one object of the invention for working up milled powder lacquer wastes by compacting the powder lacquer wastes, without fully melting them, to give a sintered product, wherein different types of powder lacquer residues or different powder lacquer residues and standard powder lacquers are milled to give powder lacquers without an extrusion treatment.

Another object of the invention is the powder lacquers obtainable by the process according to the invention.

In the process according to the invention, different types of powder lacquer residues are used. Different types of powder lacquer residues may be in particular powder lacquer residues with different colours and/or powder lacquer residues with different chemical compositions.

In a first step, the powder lacquer wastes are separated, homogeneously blended and compacted.

Then, in a second step, the sintered product obtained, e.g. in the form of coarse granules, is milled. The compacted material does not then disintegrate again into the originally present fine particles.

The coatings obtained from the powders according to the invention do not differ in quality from commercially available powder lacquers.

When preparing powder lacquers, the coloured pigments are generally added as powders prior to extrusion or are added as so-called materbatches. Subsequent submixing of pigments has proven difficult because homogeneity has to be ensured and also no subsequent separation must occur.

Surprisingly, it was found that the compacting of differently coloured fine powders with a particle size <10 μm and subsequent milling enabled the preparation of powders with a uniform colour. Different colour batches of powder lacquer residues are best homogeneously mixed prior to compacting. A uniform powder lacquer is obtained which produces a coating, after application, in which the different colours in the fine powders used can no longer be differentiated by the human eye. This mode of operation permits the use of fines from both powder lacquer preparation and also from powder lacquer processing with different shades of colour to prepare high quality products. The storage times and logistics involved in re-using different coloured batches of powder lacquer residues are greatly reduced.

In another embodiment of the process according to the invention, small amounts of coloured fine powder may be mixed and compacted with a standard powder lacquer which may have a different colour. The powder obtained in this way again produces a uniformly coloured coating in which the colour differences between the particles used cannot be determined by the human eye. Since renewed extrusion and melting of the powder lacquer does not take place, subsequent adjustment or modification of the colours of powder lacquers can thus be performed in a gentle process. It is therefore possible to add nuances of shade to powder lacquers. This is possible in particular when individual batches are produced with different shades of colour due to variations in production.

An amount of up to 10 wt. % of a coloured powder lacquer or powder lacquer residue with an average particle diameter of less than 10 μm may preferably be mixed with a differently coloured conventional powder lacquer and processed according to the invention.

The process according to the invention also enables the preparation of different batches with the same composition, but with different colours, from a clear lacquer.

The mode of operation described above also enables powder lacquers to be modified on request, by admixing a quantity of a milled, e.g. additive-containing, other powder lacquer fractions with a powder lacquer and then further processing this mixture in accordance with the process according to the invention. For example, clear powder lacquers may also subsequently be modified with additives in this way.

The fine fraction and/or powder residues to be compacted do not have to be of homogeneous composition and consist only of fines with small particle diameters.

Using the process according to the invention, powders with different particle sizes, e.g. an average particle size of 10 to 300 μm, may also be compacted and milled again with no problem. For example, it is possible to work up batches which do not have a particle size range in accordance with the required specification due to irregularities during operation of the mills, e.g. faulty batches.

Likewise, it is possible to add a proportion of oversized particles, i.e. insufficiently milled powders, to the fine fraction mentioned above.

In addition, powder lacquer overspray from spray application and unsold powder lacquer residues may also be used.

These types of residues may be added in small amounts or may be processed on their own using the process according to the invention.

The fine fraction produced during powder lacquer preparation or as powder lacquer overspray are preferably used.

For example, using the process according to the invention, a particle size distribution may be achieved in which at least 50 percent by volume of the powder lacquer particles produced has a particle size of, for example, 30 to 40 μm (d 50), wherein the proportion of particles with a particle size <10 μm may be less than 15%.

By means of the process according to the invention, for example, separated powder lacquer fine fraction with different coating compositions, optionally also together with other milled powder lacquer fractions, may be compacted so that firm agglomeration of the fine fraction takes place during the compacting process, due to sintering of the granules, so that the compacted material can be introduced directly into the milling process during powder lacquer preparation, wherein these granules do not substantially disintegrate again into the previous fines during milling. The compacted materials may be milled directly in mills conventionally used in the powder lacquer industry to produce a powder in which the range of particle sizes does not differ substantially from that in a conventional powder lacquer and which can be processed without difficulty to give a powder lacquer coating.

In general is preferable to mix powder lacquer wastes, such as oversized particles, fine fracture, application residues, faulty batches, with a similar or the same chemical composition, so that compatibility and also uniform cross-linking with each other is ensured, e.g. epoxide systems, polyester systems, polyurethane systems or acrylate systems. In particular, however, it is also possible to mix powder lacquer wastes with different compositions, e.g. polyester and epoxide systems. In this case, however, the compatibilities of the resins with each other must be tested in order to avoid defects in the coating.

The process according to the invention may be used for any powder lacquers at all, e.g. for clear powder lacquers and/or coloured powder lacquers, for example those based on epoxide, polyester, polyurethane or acrylate resins.

The compacting conditions may be chosen independently of the type of powder lacquer used. If compacting is a weak process, as is intended for example in the process for preparing tablets in the same way as described in WO 96/15891, then the compacted material disintegrates again in the mill to give the fine powder used. If the material is compacted too strongly, then the material heats up due to the heat of friction, which leads to extensive melting of the powder. The molten powder adheres strongly to the compacting devices and can be removed again only in a costly procedure. In addition the thermal stress is very high so the quality of the powder lacquer produced may be impaired. In the process according to the invention, compacting should be performed in such a way that sintering of the fines takes place without complete melting of the powder particles and the sintered portions are broken up into new granular structures during milling.

The optimum compacting conditions depend both on the powder lacquer used and also on the compacting device. During compacting, an elevated temperature is produced at the surface of the roll presses which leads to sintering or caking of the powder particles. In the case of powder lacquers which crosslink at low temperatures, for instance, the processing force can be adjusted so that the individual powder particles sinter together effectively but do not melt. For powder lacquers which crosslink at higher temperatures, for instance, the force and thus also the temperature being produced, may be adjusted to be higher. Optionally, it is possible also to provide the compacting devices with external heating or cooling, e.g. the rolls may be cooled with water.

Basically, any known compacting devices such as piston presses, ram extruders, in particular two-roll presses or ring-roll presses, are suitable for the process according to the invention. Here, the compression force in roll presses is determined for its part by the gap, by the speed of rotation and by the amount of material supplied. The parameters can readily be mutually adjusted with respect to each other. The compression force is stated as a specific compression force, in N per cm of roll width. In general the specific compression force should be greater than 4 kN/cm, a value of greater than 6 kN/cm being particularly beneficial. For example, the specific compression forces are in the range from 10 to greater than 30 kN/cm and up to 100 kN/cm. Too high a compression force is recognised by extensive melting of the powder, i.e. filaments pull away from the material and stick to the rolls. Too low a compression force leads to a greatly increased proportion of fine fraction in the milling process. Two-roll presses with textured surfaces have proven to be especially suitable, those with tablet-shaped depressions being less suitable than those with grooves in the surface.

If, on compacting, a product is obtained which is not suitable for milling due to its dimensions, the product may be broken up, e.g. to form chips or granules. Crushing can be performed with devices which are conventionally used in the production of powder lacquers, e.g. with so-called finger-breakers.

The subsequent milling process is performed with devices which are conventionally used in the production of powder lacquers, e.g. with impact mills or classifier mills, which enable gentle preparation of the coating powder. This produces a further advantage of the process according to the invention, which is based on the fact that the working up procedure sometimes takes place within conventional powder lacquer preparation and does not require any extra milling devices at all. The powder lacquers produced from compacted granules have a proportion of fine fraction which is comparable to that of conventional powder lacquers and this is normally, for example, less than 25% fines, optionally even less than 15%.

The mode of operation according to the invention provides a process which avoids the disadvantages of the known prior art for the re-processing of fine powders and other powder lacquer wastes, in particular additional heating or melting steps. Furthermore, the storage times for fine fraction or powder lacquer residues arising during application are reduced. The proportions of fine fraction and residues produced in particular during the processing of powders can be worked up in the process according to the invention, by compacting and milling, to give a high quality powder without an extrusion step being required. Neither the particle size distribution of the powder obtained nor the quality of the coatings produced from the powders differ from those of conventional powder lacquers. In addition, the mode of operation according to the invention offers the opportunity to process batches which are defective with regard to colour to give marketable, high quality powder lacquers with the correct colour.

The following examples explain the invention. The compression force of the rolls is cited as specific compression force per cm of roll width (kN/cm).

EXAMPLE 1

18 kg of fine fraction of <10 $\mu$m (average particle size about 4 $\mu$m) from the milling of a conventional thermally crosslinkable white powder lacquer based on an epoxy/polyester hybrid (49% polyester, 21% epoxide, 29% titanium dioxide and 1% additives) were compacted with the aid of a two-roll compactor from the Bepex Co. using a surface-textured roll with a throughput of about 25 kg/h at a compression force of 8 kN/cm. The compacted, homogeneous extrudate obtained in this way, which was mechanically stable, was crushed in a breaker into chips with a diameter of about 2 cm. These chips were milled in a mill (manufacturer, Hosokava, Type ACM 2) under the conventional conditions for powder lacquers. A powder with an average particle size of 45 $\mu$m and a proportion with a size <10 $\mu$m of less than 15% was obtained.

The powder was sprayed onto aluminium sheeting electrostatically using a corona gun and stoved for 20 min at 180° C. A defect-free coating with properties which did not differ from a coating which had been obtained directly using the non-compacted powder mentioned above, was obtained.

EXAMPLE 2

16 kg of fine fraction of <10 $\mu$m (average particle size about 4 $\mu$m) from the milling of a black coloured thermally crosslinkable powder lacquer based on an epoxide with a dicyanogen crosslinker were compacted with the aid of a two-roll compactor from the Bepex Co. using a surface-textured roll with a throughput of about 22 kg/h and a compression force of 14 kN/cm. The compacted, homogeneous extrudate obtained in this way, which was mechanically stable, was crushed in a breaker into chips with a diameter of about 2 cm. These chips were milled in a mill (manufacturer, Hosokava, Type ACM 2) under the conventional conditions for powder lacquers. A powder with an average particle size of 37 $\mu$m and a proportion with a size <10 $\mu$m of less than 14% was obtained.

The powder was sprayed onto aluminium sheeting electrostatically using a corona gun and stoved for 20 min at 180° C. A defect-free coating with properties which did not differ from a coating which has been obtained using the non-processed powder, was obtained.

EXAMPLE 3

20 kg of fine fraction of <10 $\mu$m (average particle size about 4 $\mu$m) from the milling of a conventional thermally crosslinkable powder lacquer based on an polyester with triglycidyl isocyanurate (TGIC) as crosslinker (55.8% polyester, 4.2% TGIC, 29% titanium dioxide and 1% additives) were compacted with the aid of a two-roll compactor from the Bepex Co. using a surface-textured roll with a throughput of about 20 kg/h at a compression force of 20 kN/cm. The compacted, homogeneous extrudate obtained in this way, which was mechanically stable, was crushed in a breaker into chips with a diameter of about 2 cm. These chips were milled in a mill (manufacturer, Hosokava, Type ACM 2) under the conventional conditions for powder lacquers. A powder with an average particle size of 27 µm and a proportion with a size <10 µm of less than 25% was obtained.

The powder was sprayed onto aluminium sheeting electrostatically using a corona gun and stoved for 20 min at 180° C. A defect-free coating with properties which did not differ from a coating which had been obtained directly using the non-compacted powder lacquer, was obtained.

EXAMPLE 4

16 kg of fine fraction of <10 µm (average particle size about 4 µm) from the milling of a grey coloured thermally crosslinkable powder lacquer, modified with wax and based on an epoxide with dicyanogen as a hardener component were compacted with the aid of a two-roll compactor from the Bepex Co. using a surface-textured roll with a throughput of about 27 kg/h at a compression force of 16 kN/cm. The compacted, homogeneous extrudate obtained in this way, which was mechanically stable, was crushed in a breaker into chips with a diameter of about 2 cm. These chips were milled in a mill (manufacturer, Hosokava, Type ACM 2) under the conventional conditions for powder lacquers. A powder with an average particle size of 36 µm and a proportion with a size <10 µm of less than 20% was obtained.

The powder was sprayed onto aluminium sheeting electrostatically using a corona gun and stoved for 20 min at 180° C. A defect-free coating with properties which do not differ from a coating which had been obtained directly using the powder lacquer, was obtained.

EXAMPLE 5

10 kg of fine fraction of <10 µm (average particle size about 4 µm) from the milling of differently coloured epoxide powder lacquers (red, white, yellow and grey) were mixed and compacted with the aid of a two-roll compactor from the Bepex Co. using a surface-textured roll with a throughput of about 27 kg/h at a compression force of 7 kN/cm. The compacted, homogeneous extrudate obtained in this way, which was mechanically stable and had a uniform old rose colour, was crushed in a breaker into chips with a diameter of about 2 cm. These chips were milled in a mill (manufacturer, Hosokava, Type ACM 2) under the conventional conditions for powder lacquers. A powder with an average particle size of 40 µm and a proportion with a size <10 µm of less than 15% was obtained. The powder had a homogeneous colour and also the powdered particles were substantially one colour.

The powder was sprayed onto aluminium sheeting electrostatically using a corona gun and stoved for 20 min at 180° C. A defect-free coating with properties which did not differ from a conventional coating was obtained. It consisted of a uniform shade of colour and colour differences which could be attributed to the use of a mixture of differently coloured fine fraction were not detectable.

Comparison example 1

In the same way as in example 1, 10 kg of fine fraction were compacted in a Bepex roll compactor with tabletting rolls to produce tablets with 10 mm diameter and 3 mm thickness, the force applied by the rolls corresponded to 4 kN/cm. Subsequent milling of the tablets in a mill (manufacturer Hosokava, Type ACM 2) produced a powder with an average particle size <10 µm. This powder behaved like the fine material used and could not be processed in conventional powder lacquer processing plants.

EXAMPLE 6

8 kg of fine fraction from example 3 were compressed with the aid of a two-roll compactor from the Alexanderwerk Co. (Type WP 50N 75) with a compression force of 9 kN/cm of roll width and a throughput of about 80 kg/h to give a mechanically stable, homogeneous extrudate which was crushed coarsely mechanically and then milled in a mill (manufacturer, Hosokava, Type ACM2) under the conditions conventionally used for powder lacquers. A powder with an average particle size of 35 µm and a proportion with size <10 µm of 19% was obtained.

EXAMPLE 7

9 kg of fine fraction from example 3 were compressed with the aid of a two-roll compactor from the Alexanderwerk Co. (Type WP 50N 75) with a compression force of 12 kN/cm of roll width and a throughput of about 50 kg/h to give a mechanically stable, homogeneous extrudate which was crushed coarsely mechanically and then milled in a mill (manufacturer, Hosokava, Type ACM2) under the conditions conventionally used for powder lacquers. A powder with an average particle size of 32 µm and a proportion with size <10 µm of 15% was obtained.

Comparison example 2

5 kg of fine fraction from example 3 were compressed with the aid of a two-roll compactor from the Alexanderwerk Co. (Type WP 50N 75) with a compression force of 4 kN/cm of roll width and a throughput of about 100 kg/h to give a mechanically stable, homogeneous extrudate which was crushed coarsely mechanically and then milled in a mill (manufacturer, Hosokava, Type ACM2) under the conditions conventionally used for powder lacquers. A powder was obtained in which more than 40% of the particles were less than 10 µm and was not suitable for use as a powder lacquer.

What is claimed is:

1. A process for reprocessing crosslinkable polymer powder wastes to provide a re-usable powder which comprises
    a) compacting the powder wastes having an average diameter of <10 µm, without completely melting the powder, to provided a sintered product, and
    b) milling the sintered product to provide a powder composition having a particle size distribution in which at least 50 percent by volume of the powder particles have a particle size of 30 to 45 µm and the proportion with a particle size of less than 10 µm is <15%;

wherein the powder wastes comprise resins selected from the group consisting of epoxide resins, polyester resins, polyurethane resins, acrylate resins, and mixtures thereof.

2. A process according to claim 1 wherein the powder waste is a mixture of a powder waste and a different standard crosslinkable polymer powder.

3. A process according to claim 1 wherein colored powder wastes are mixed with a standard crosslinkable polymer powder of another color and the amount of the colored powder waste is smaller than that of the standard powder.

4. A process according to claim 1 wherein the compacting is performed by a two-roll press.

5. A process according to claim 4 in which the two-roll press uses a specific compression force between 4 kN/cm and 100 kN/cm.

6. A process according to claim 4 in which the two-roll press uses a compression force between 5 kN/cm and 50 kN/cm.

7. A process according to claim 1 wherein the particle size of the powder wasted used is up to 250 μm.

8. A process according to claim 7 wherein the particle size of the powder wastes have an average diameter of <10 μm.

9. A process according to claim 1 in which powder wastes of similar chemical composition are first mixed and then processed.

10. A process according to claim 1 wherein different colored powder wastes are first mixed and then processed.

11. A process according to claim 1 wherein the powder waste is mixed with conventional crosslinkable polymer powders comprising resins selected from the groups consisting of epoxide resins, polyester resins, polyurethane resins, acrylate resins, and mixtures thereof prior to being compacted.

12. A process according to claim 11 wherein up to 10 wt.% of differently colored crosslinkable polymer powder wastes with an average particle diameter of <10 μm are added to the conventional crosslinkable polymer powder and mixed and compacted and milled.

13. A powder composition obtained by the process of claim 1 in which the powder wastes are compacted and milled without additional melting of the powder.

14. A powder composition according to claim 13 obtained from a mixture of at least two differently colored crosslinkable polymer powder wastes.

15. A powder composition according to claim 13, obtained from a mixture of up to 10 wt.% of a colored crosslinkable polymer powder having an average particle diameter of <10 μm and a differently colored crosslinkable polymer conventional powder.

16. A powder composition according to claim 13 obtained from a mixture of at least two crosslinkable polymer powders having different chemical compositions.

17. A process according to claim 1 wherein the compacting is performed by a ring-roll press.

18. A process according to claim 17 in which the ring-roll press uses a specific compression force between 4 kN/cm and 100 kN/cm.

19. A process according to claim 17 in which the ring-roll press uses a compression force between 5 kN/cm and 50 kN/cm.

* * * * *